UNITED STATES PATENT OFFICE 2,379,639

1 - (4 - SULPHAMYLPHENYL) - 3 - (4 - SULPHAMYLPHENYLIMINO) - 5 - ARYL - 2 - PYRROLIDONE

Martin Everett Hultquist, Bound Brook, N. J., assignor to American Cyanamid Company, New York, N. Y., a corporation of Maine No Drawing. Application August 26, 1942, Serial No. 456,265

6 Claims. (Cl. 260—239.6)

This invention relates to 1-(4-sulphamylphenyl)-3-(4-sulphamylphenyl-imino) - 5 - aryl - 2 - pyrrolidone and a method of preparing the same.

A number of substituted pyrrolidones have been prepared for use as intermediates in the preparation of other compounds and other processes. According to the present invention the substituted pyrrolidone having sulphonamido groups is produced. The product may be represented by the following formula:

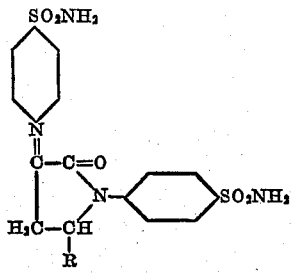

in which R is a mononuclear aryl of the benzene series.

The present invention is not limited to any particular process in making the compounds, but I prefer to use a very simple procedure in which sulphanilamide is reacted with pyruvic acid and the corresponding aryl aldehyde.

The invention will be described in greater detail in conjunction with the following spsecific examples, which are illustrative. The parts are by weight.

*Example 1*

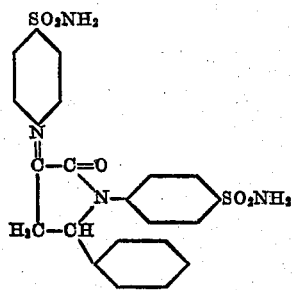

173 parts of sulphanilamide are reacted with 106 parts of benzaldehyde in 2000 parts of ethyl alcohol, the reaction taking place at the boiling point of the alcohol under a reflux. After heating for a short time 63 parts of pyruvic acid is gradually added and then the reaction mixture heated for several hours. As the reaction proceeds crystallization of a solid precipitate takes place and when the reaction is substantially complete the mixture is cooled to 20° C., the solid precipitate filtered off and recrystallized from 80% acetone. A crystalline solid is obtained which does not have a sharp melting point, melting with decomposition taking place at from 295 to 310° C. The product obtained is practically insoluble in water, alcohol, or an aqueous sodium bicarbonate solution and its analysis shows it to be 1-(4-sulphamylphenyl)-3-(4-sulphamylphenylimino)-5-phenyl-2-pyrrolidone.

*Example 2*

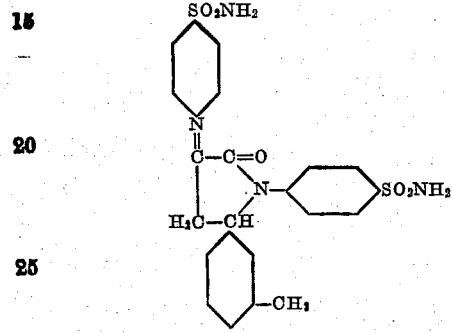

The process of Example 1 is followed using an amount of m-toluyl aldehyde stoichiometrically equivalent to the benzaldehyde. The reaction proceeds in the same manner, a product being produced which melts at about 300° C. with decomposition. Any one of the isomeric toluyl aldehydes may be used, or a mixture.

I claim:

1. A 1-(4-sulphamylphenyl)-3-(4-sulphamylphenylimino)-5-aryl-2-pyrrolidone having the following formula:

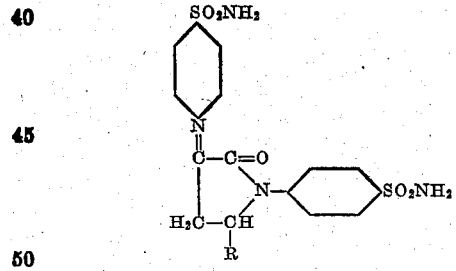

in which R is a monocyclic aryl radical of the benzene series.

2. A 1-(4-sulphamylphenyl)-3-(4-sulphamylphenylimino)-5-phenyl-2-pyrrolidone having the following formula:

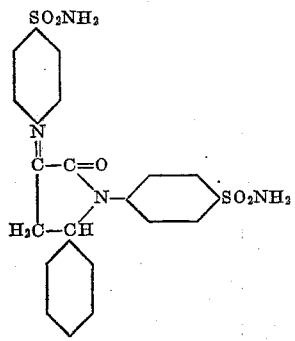

3. A method of producing 1-(4-sulphamylphenyl)-3-(4-sulphamylphenylimino)-5-aryl-2-pyrrolidone, which comprises reacting sulphanilamide and pyruvic acid with a monocyclic aldehyde of the benzene series.

4. A method of producing 1-(4-sulphamylphenyl)-3-(4-sulphamylphenylimino)-5-phenyl-2-pyrrolidone which comprises reacting sulphanilamide pyruvic acid and benzaldehyde.

5. A method according to claim 3 in which the reaction is effected in boiling ethyl alcohol solution.

6. A method according to claim 4 in which the reaction is effected in boiling ethyl alcohol solution.

MARTIN EVERETT HULTQUIST.